(12) United States Patent
Devaraj et al.

(10) Patent No.: US 12,479,864 B2
(45) Date of Patent: Nov. 25, 2025

(54) METHODS FOR PREPARING CATALYST PRECURSOR MATERIALS

(71) Applicant: Dow Global Technologies LLC, Midland, MI (US)

(72) Inventors: Jayachandran Devaraj, Zionsville, IN (US); Chunming Zhang, Indianapolis, IN (US); Shawn D. Feist, Midland, MI (US); Heqi Pan, Midland, MI (US); Donnie W. Blaylock, Katy, TX (US); Ian B. Gillespie, Midland, MI (US); Patrick L. Heider, Midland, MI (US); Clark S. Davis, Midland, MI (US); Andre Yvon-Bessette, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 802 days.

(21) Appl. No.: 17/600,359

(22) PCT Filed: Mar. 27, 2020

(86) PCT No.: PCT/US2020/025239
§ 371 (c)(1),
(2) Date: Sep. 30, 2021

(87) PCT Pub. No.: WO2020/205525
PCT Pub. Date: Oct. 8, 2020

(65) Prior Publication Data
US 2022/0251115 A1    Aug. 11, 2022

Related U.S. Application Data

(60) Provisional application No. 62/827,128, filed on Mar. 31, 2019.

(51) Int. Cl.
*C07F 1/02* (2006.01)
*C08F 10/02* (2006.01)

(52) U.S. Cl.
CPC ............... *C07F 1/02* (2013.01); *C08F 10/02* (2013.01)

(58) Field of Classification Search
CPC .......... C07F 1/02; C07F 7/081; C07F 7/0827; C07F 7/12; C07F 7/30; C08F 10/02
See application file for complete search history.

(56) References Cited

U.S. PATENT DOCUMENTS

2010/0130709 A1   5/2010   Chen et al.
2020/0010586 A1*  1/2020   Nguyen ............... C07F 7/0816

FOREIGN PATENT DOCUMENTS

CN      109476783 A      3/2019
WO      2018/022975 A1   2/2018
(Continued)

OTHER PUBLICATIONS

International Search Report and Written Opinion issued by the European Patent Office acting as International Searching Authority for International Patent Application No. PCT/US2020/025239 dated Jul. 7, 2020 (15 total pages).

(Continued)

*Primary Examiner* — Brian A Mccaig
(74) *Attorney, Agent, or Firm* — Dinsmore & Shohl LLP

(57) ABSTRACT

Methods for preparing a catalyst precursor material from dihalo-substituted metalloids are provided. The methods In include mixing a first solution of a halogenated alkane, at least one solvent, and a first component selected from a dihalo-substituted-group-14 metalloid or an organolithium reagent in a first reaction zone. Continuously adding the first solution to a second reaction zone, and continuously adding a second solution to the second reaction zone. The second (Continued)

solution including at least one solvent and a second component of either the dihalo-substituted-group-14 metalloid or the organolithium reagent, the second component is different from the first component. Mixing the first solution and the second solution in the second reaction zone.

20 Claims, 3 Drawing Sheets

(56) References Cited

FOREIGN PATENT DOCUMENTS

WO     2018083056 A1     5/2018
WO     2018/164658 A1     9/2018

OTHER PUBLICATIONS

Japanese Office Action dated Jan. 30, 2024, pertaining to JP Patent Application No. 2021-557635, 6 pgs.
Chinese Office Action dated Mar. 23, 2024, pertaining to CN Patent Application No. 202080029443.7, 9 pgs.
Singapore Written Opinion dated Mar. 21, 2024, pertaining to SG Patent Application No. 11202110593W, 5 pgs.
International Preliminary Report on Patentability for Application No. PCT/US2020/025239 issued Sep. 28, 2021, pp. 1-7.
Singapore Search Report and Written Report, dated Mar. 8, 2023 pertaining to Singapore Patent Application No. 11202110593W, 9 pages.
Kopach, M.E. et al., Flow Grignard and Lithiation: Screening Tools and Development of Continuous Processes for a Benzyl Alcohol Starting Material.Organic Process Research & Development, Aug. 12, 2016, vol. 20, No. 9, pp. 1581-1592, 15 pages.
Flow Chemistry—Benefits of Continuous Flow Chemistry https://www.mt.com/sg/en/home/applications.L1_AutoChem_Applications/continuous.html#overviewaf. 18 pages.
Brazil Office Action dated Dec. 21, 2023, pertaining to BR Patent Application No. BR112021019414.2, 4 pgs.
Chinese Office Action dated Sep. 4, 2023, pertaining to CN Application No. 202080029443.7, 12 pgs.
Chinese Office Action dated Jun. 21, 2024, pertaining to CN Patent Application No. 202080029443.7, 10 pgs.
Brazil Office Action dated Sep. 10, 2024, pertaining to BR Patent Application No. BR112021019414.2, 8 pgs.
Korean Office Action dated Apr. 8, 2025, pertaining to KR Patent Application No. 10-2021-7034836, 18 pgs.
Brazilian Office Action dated Apr. 8, 2025, pertaining to BR Patent Application No. BR112021019414-2, 6 pgs.

* cited by examiner

METHODS FOR PREPARING CATALYST PRECURSOR MATERIALS

BACKGROUND

Field

The present specification generally relates to methods for preparing catalyst precursor materials from dihalo-substituted metalloids. In particular, the present specification is directed to methods for preparing catalyst precursor materials from a dihalo-substituted-group-14 metalloid, a halogenated alkane, an organolithium reagent, and a solvent in a continuous addition reaction.

Technical Background

Linear low-density ethylene-based polymers are designed and increasingly being used to meet the growing demand for packaging, hygiene, and medical products. Dihalo-substituted metalloids may be used to form reaction catalysts that produce linear low density ethylene-based polymer resins. However, the solutions used to produce these dihalo-substituted metalloids are prone to disassociation even at mild conditions, which makes them difficult and costly to produce.

Current methods for preparing these catalyst precursor materials from dihalo-substituted metalloids require batch reactions, which are thermally unstable and leading to purity variations from batch to batch. Accordingly, alternative methods for producing these catalyst precursor materials are needed. For instance, processes that can increase output and easily and consistently control the temperature of the reactants that form dihalo-substituted metalloids are desired.

SUMMARY

According to one embodiment, a method includes mixing a first solution comprising a halogenated alkane, at least one solvent, and a first component selected from one of a dihalo-substituted-group-14 metalloid or an organolithium reagent in a first reaction zone; continuously adding the first solution to a second reaction zone; continuously adding a second solution to the second reaction zone, the second solution comprising at least one solvent and a second component selected from one of the dihalo-substituted-group-14 metalloid or the organolithium reagent, wherein the second component is different from the first component; and mixing the first solution and the second solution in the second reaction zone.

According to other embodiments, a method includes reacting an organolithium reagent, a halogenated alkane, and at least one solvent in a first reaction zone to form a first solution; continuously adding the first solution and a second solution to a second reaction zone, wherein the second solution comprises a dihalo-substituted-group-14 metalloid and at least one solvent; and mixing the first solution and the second solution in the second reaction zone.

Additional features and advantages will be set forth in the detailed description which follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
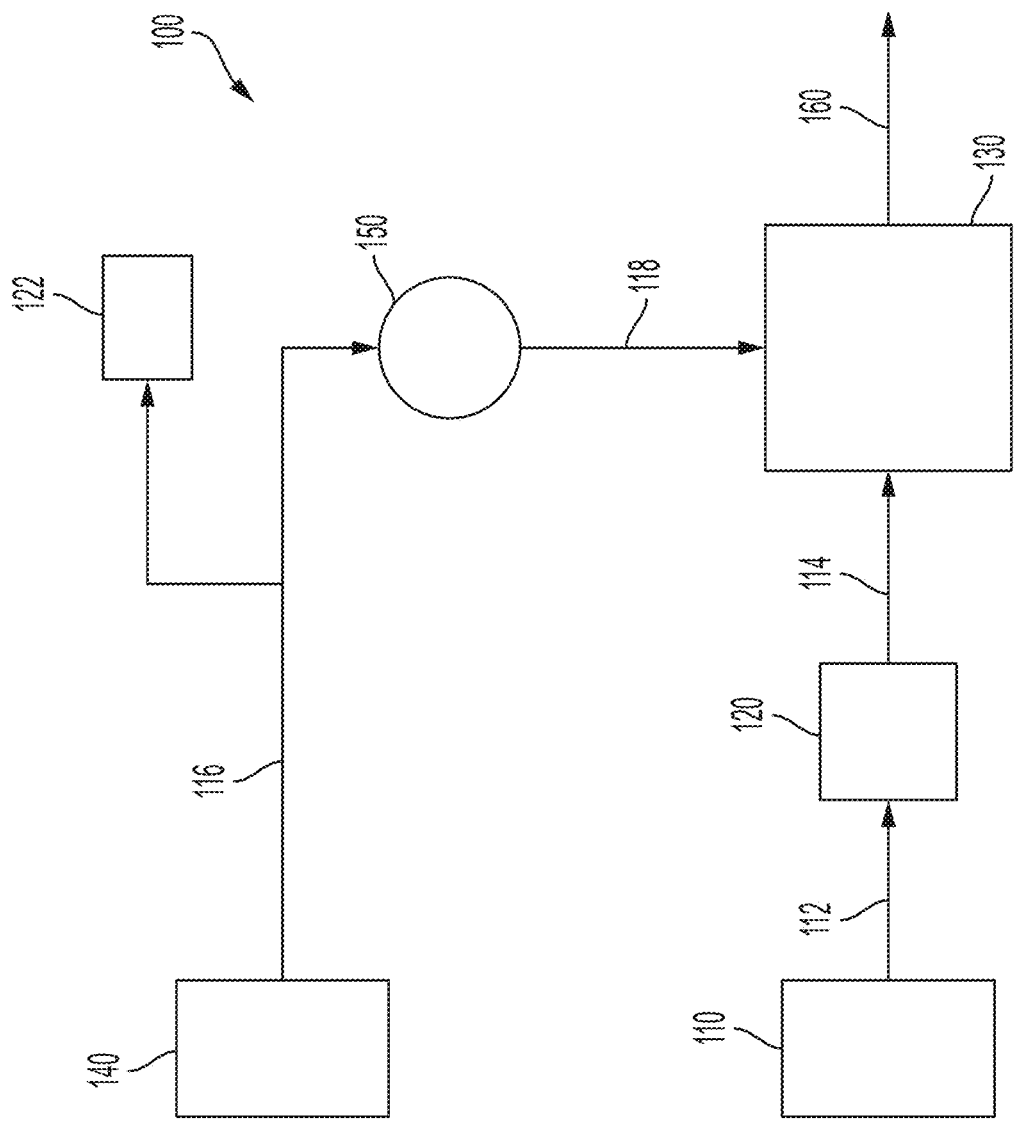
FIG. 1 schematically depicts a system for preparing catalyst precursor materials according to one or more embodiments disclosed and described herein.

Reference will now be made in detail to embodiments of methods for preparing catalyst precursor materials from dihalo-substituted metalloids. Whenever possible, the same reference numerals will be used throughout the drawings to refer to the same or like parts.

As used herein, the term "metalloid" refers to a chemical element having properties in between, or that are a mixture of, the properties of metals and nonmetals.

As used herein, the term "group-14 metalloid" refers to metalloids that are members of group 14 in the IUPAC periodic table. Examples of group-14 metalloids include, without limitation, silicon and germanium.

As used herein, the term "dihalo-substituted-group-14 metalloid" refers to a group 14 metalloid that includes (a) two halogenated substituents and (b) two additional substituents. The two halogenated substituents may include, but are not limited to, fluorine, bromine, chlorine, and iodine. The two halogenated substituents may be identical to one another or may be different from one another. The two additional substituents may be identical to one another or may be different from one another. In embodiments, the additional substituents may include, but are not limited to, an isopropyl group, a tert-butyl group, a hexyl group, or combinations thereof.

As used herein, the term "halogenated alkane" refers to any alkane that includes (a) from 1 carbon atom to 3 carbon atoms and (b) at least one halogenated substituent. The at least one halogenated substituent may include, but is not limited to, fluorine, bromine, chlorine, and iodine. In embodiments, the halogenated alkane may include a di-halogenated methane.

As used herein, the term "organolithium reagent" refers to any organometallic compound that includes at least one carbon—lithium bond.

As used herein, the term "solvent" includes any substance capable of dissolving one or more of the dihalo-substituted-group-14 metalloid, the organolithium reagent, or the halogenated alkane. Suitable solvents may include, but are not limited to, any ethereal solvent, alkyl solvent, or aromatic solvent. A solvent may be present in any of the systems described herein alone or in any combination.

Examples of suitable ethereal solvents may include, but are not limited to, tetrahydrofuran, 2-methyltetrahydrofuran, dimethyl ether, tert-butyl methyl ether, cyclopentyl methyl ether, and 1,2-dimethoxyethane.

Examples of suitable alkyl solvents may include, but are not limited to, any alkane that includes from 1 carbon atom to 40 carbon atoms. In embodiments, the alkyl solvent includes from 5 carbon atoms to 7 carbon atoms.

Examples of suitable aromatic solvents may include any suitable alkylbenzene compound. Specific examples suitable aromatic solvents include, but are not limited to, benzene, $C_2$-benzenes, $C_3$-benzenes, or $C_4$-benzenes.

In embodiments, a method for preparing catalyst precursor materials includes continuously adding a first solution comprising an organolithium reagent, a halogenated alkane, and at least one solvent to a first reaction zone; mixing the first solution in the first reaction zone; continuously adding the first solution and a second solution comprising a dihalo-substituted-group-14 metalloid and at least one solvent to a second reaction zone; and mixing the first solution and the second solution in the second reaction zone.

In further embodiments, a method for preparing catalyst precursor materials includes mixing a first solution comprising a halogenated alkane, at least one solvent, and a first component selected from one of a dihalo-substituted-group-14 metalloid or an organolithium reagent in a first reaction zone; continuously adding the first solution to a second reaction zone; continuously adding a second solution to the second reaction zone, the second solution comprising at least one solvent and a second component selected from one of the dihalo-substituted-group-14 metalloid or the organolithium reagent, wherein the second component is different from the first component; and mixing the first solution and the second solution in the second reaction zone.

Conventional methods for forming catalyst precursor materials include batch production methods, which are performed in an ad hoc manner. Conventional methods include preparing a feed solution, which comprises a dihalo-substituted-group-14 metalloid and a halogenated alkane in a solvent, in a vessel that is cooled in an acetone-dry ice bath to at least −70° C. An organolithium reagent is added to the vessel over a span of hours, such as 6 hours, making sure to direct the organolithium reagent to the wall of the vessel to cool it before it mixes with the other reactants. However, such batch production methods often result in errors, which may result from unexpected or uncontrolled temperature changes. These errors can cause the purity of the catalyst precursor material to be negatively impacted.

Figure 2:
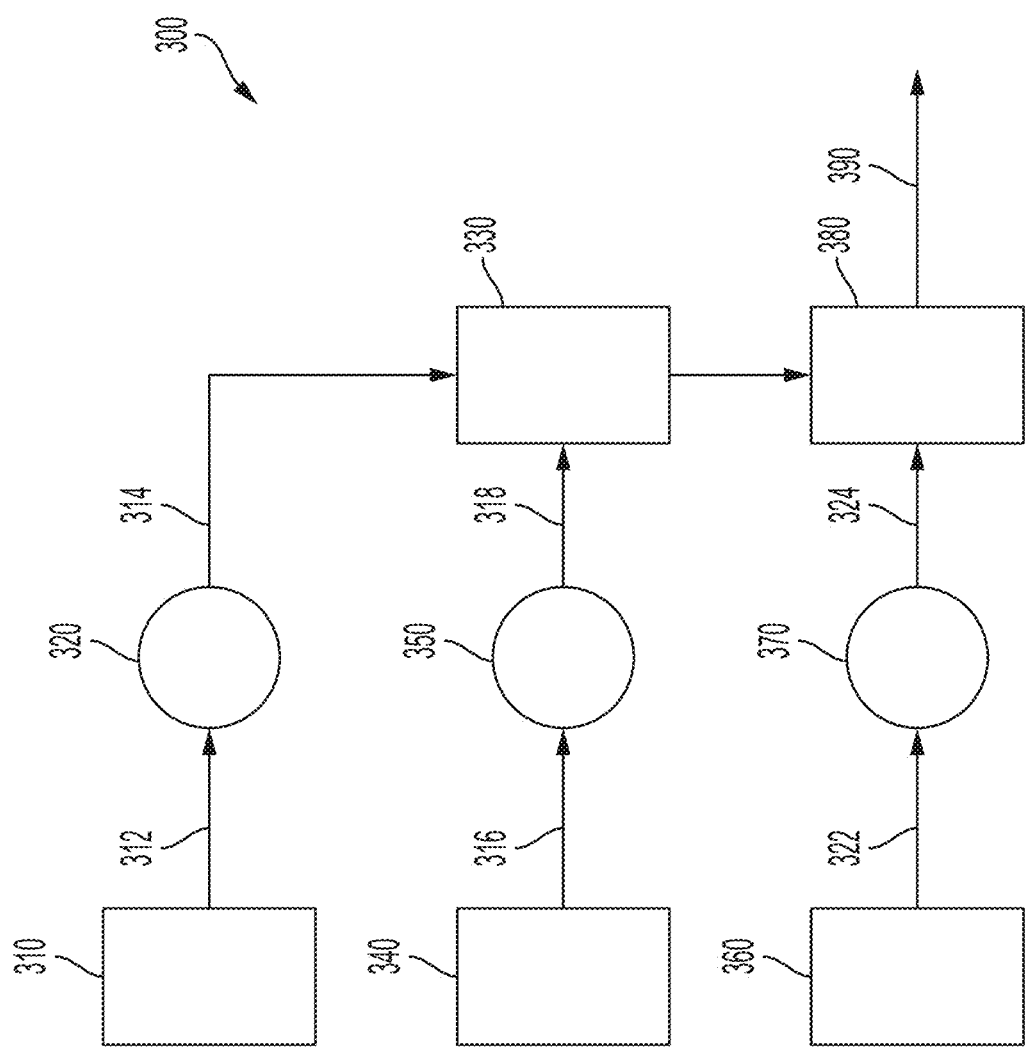
FIG. 2 schematically depicts an alternative system for preparing catalyst precursor materials according to one or more embodiments disclosed and described herein.
Figure 3:
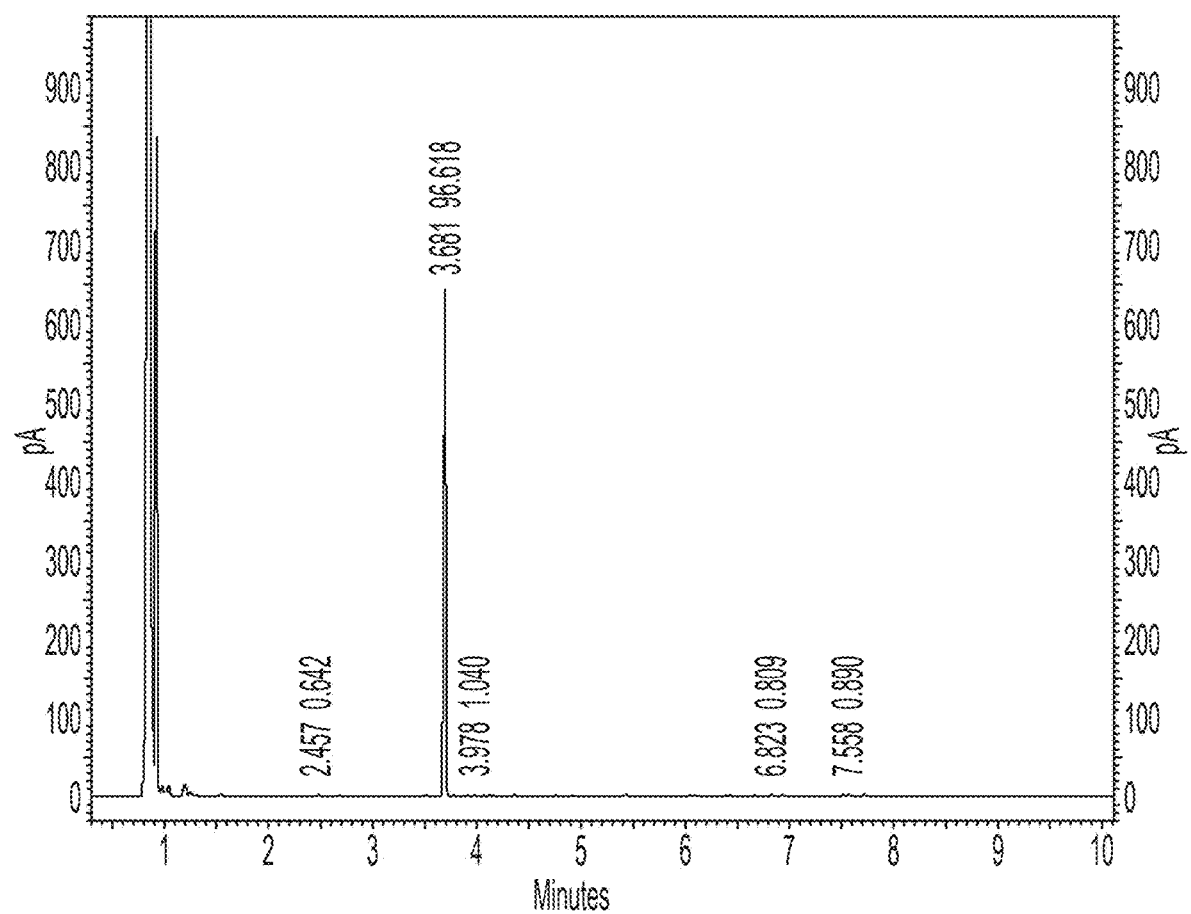
FIG. 3 depicts a gas chromatography (GC) spectrum of a catalyst precursor materials produced according to one or more embodiments disclosed and described herein.

In contrast, the systems of embodiments shown in FIGS. 1-3 are continuous synthesis systems, in which the reactants are fed continuously into one or more reaction zones. The embodiments depicted in FIGS. 1-3, described herein, provide suitable systems for preparing the catalyst precursor materials.

With reference now to FIG. 1, systems and methods for producing a catalyst precursor material by feeding a continuous stream into a reaction zone are described. In embodiments of the catalyst precursor material production systems 100 shown in FIG. 1, the contents of a first reagent feed tank 110 are introduced to a pre-cooler 120 by a first reagent feedstream 112, which fluidly couples the first reagent feed tank 110 to the pre-cooler 120. The first reagent feed tank 110 may include any suitable storage apparatus such as a cooled vessel, optionally with the ability to mix its contents. It should further be understood that the first reagent feed tank 110 and the pre-cooler 120 may be a single, combined physical unit (not shown in FIG. 1) or separate physical units, which are fluidly coupled to one another.

A heat exchanger may be optionally added anywhere along the first reagent feedstream 112 to further cool the contents of the first reagent feed tank 110 before the contents of the first reagent feed tank 110 are introduced to the pre-cooler 120. The contents of the first reagent feed tank 110, according to embodiments, may include a mixture of a dihalo-substituted-group-14 metalloid and a halogenated alkane, optionally in solvent. In embodiments, the solvent is an ethereal solvent, an alkyl solvent, an aromatic solvent, or combinations thereof.

In embodiments, the dihalo-substituted-group-14 metalloid, which is initially present in the system in first reagent feed tank 110, may include, but is not limited to, dichlorodiisopropylsilane, di-tert-butyldichlorosilane, dichlorodiphenylsilane, dichlorodiisopropylgermane, di-tert-butyldichlorogermane, dichlorodiphenylgermane, or combinations thereof. In certain embodiments, the dihalo-substituted-group-14 metalloid present in the first reagent feed tank 110 is dichlorodiisopropylsilane.

In embodiments, a halogenated alkane is also initially present in the system in the first reagent feed tank 110 or may be added to the system in the pre-cooler 120 (not shown in FIG. 1). The halogenated alkane may be any suitable halogenated alkane, such as a di-halogenated methane. Examples of suitable di-halogenated methanes include, but are not limited to, dibromomethane, dichloromethane, difluoromethane, diiodomethane, bromochloromethane, bromofluoromethane, bromoiodomethane, chlorofluoromethane, chloroiodomethane, fluoroiodomethane, or combinations thereof. In certain embodiments, the halogenated alkane initially present in the first reagent feed tank 110 is bromochloromethane.

Once the contents of the pre-cooler 120, which may, according to embodiments, include an apparatus to mix its components, are at a desired capacity, the contents of the pre-cooler 120 are continuously added to the reaction zone 130 by a feedstream 114, which fluidly couples the pre-cooler 120 to the reaction zone 130.

It should be understood that the concentrations of the various components in the first reagent feed tank 110 may be modified by adding solvent at any point before feed stream 114 is added to the reaction zone 130, such as, for example at the first reagent feed tank 110, into the first reagent feedstream 112, into the precooler 120, or into the feedstream 114. Without being bound by theory, it is believed that if the dihalo-substituted-group-14 metalloid and/or the halogenated alkane has a concentration that is either too high or too low, it negatively affects the dilution of the components, control of the reaction rates, mixing control, and temperature maintenance of system.

Concurrently, the contents of a second reagent feed tank 140 are fed through a heat exchanger 150 by a second reagent feedstream 116, which fluidly couples the second reagent feed tank 140 to the heat exchanger 150. The second reagent feed tank 140 may include any suitable storage apparatus such as a cooled vessel, optionally with the ability to mix any of its contents. It should be further understood that the second reagent feed tank 140 and the heat exchanger 150 may be a single, combined physical unit (not shown in FIG. 1) or separate physical units.

Before being continuously added to the reaction zone 130, the contents of feedstream 114 and feedstream 118 are cooled to temperatures from 0° C. to −90° C., such as cooled in precooler 120 and heat exchanger 150. In embodiments, the feedstream 114 and feedstream 118 are independently cooled to temperatures from −5° C. to −90° C., such as from −10° C. to −90° C., from −15° C. to −90° C., from −20° C.

to −90° C., from −25° C. to −90° C., from −30° C. to −90° C., from −35° C. to −90° C., from −40° C. to −90° C., from −45° C. to −90° C., from −50° C. to −90° C., from −55° C. to −90° C., from −60° C. to −90° C., from −65° C. to −90° C., from −70° C. to −90° C., from −75° C. to −90° C., from −80° C. to −90° C., or from −85° C. to −90° C. before being continuously introduced into the reaction zone 130. In some embodiments, the feedstream 114 and feedstream 118 are independently cooled to temperatures from 0° C. to −85° C., such as from 0° C. to −80° C., from 0° C. to −75° C., from 0° C. to −70° C., from 0° C. to −65° C., from 0° C. to −60° C., from 0° C. to −55° C., from 0° C. to −50° C., from 0° C. to −45° C., from 0° C. to −40° C., from 0° C. to −35° C., from 0° C. to −30° C., from 0° C. to −25° C., from 0° C. to −20° C., from 0° C. to −15° C., or from 0° C. to −10° C. before being continuously introduced into the reaction zone 130. In embodiments, the feedstream 114 and the feedstream 118 are independently cooled to temperatures from −20° C. to −80° C., such as from −30° C. to −70° C., from −35° C. to −65° C., from −40° C. to −60° C., or from −45° C. to −55° C. before being continuously introduced into the reaction zone 130. Without being bound by theory, it is believed that the addition of the organolithium reagent to the reaction zone 130 causes an exothermic reaction, so that the system must be cooled to suitable temperatures to avoid spoliation of one or more of the reactions that occur when the contents are introduced to the reaction zone 130 at temperatures outside of the described suitable range. As previously described, the contents entering the reaction zone 130 may be cooled by any suitable cooling apparatus, such as, for example, the heat exchanger 150.

According to embodiments, the contents of the second reagent feed tank 140 include the organolithium reagent. In embodiments, the organolithium reagent, which is initially present in the system in the second reagent feed tank 140, may include any suitable organolithium reagent. Examples of suitable organolithium reagents may include, but are not limited to, n-butyllithium, s-butyllithium, t-butyllithium, methyllithium, or combinations thereof. In certain embodiments, the organolithium reagent initially present in the second reagent feed tank 140 is n-butyllithium.

Optionally, an amount of solvent may be added to the second reagent feed tank 140 and/or at any point along the second reagent feedstream 116 in order to dilute the organolithium reagent being fed to the heat exchanger 150. Once the second reagent feedstream 116 is passed through the heat exchanger 150, it is fed to the reaction zone 130 by a cooled feedstream 118, which fluidly couples the heat exchanger 150 with the reaction zone 130. In embodiments, the solvent is an ethereal solvent, an alkyl solvent, an aromatic solvent, or combinations thereof.

A quench pot 122 that includes a quenching agent, such as, for example, ammonium chloride, may optionally be provided at any point along the second reagent feedstream 116 should excess amounts of the organolithium reagent be passed through the second reagent feedstream 116 and distributed to other components of the system (such as the reaction zone 130), thereby leading to process upsets. However, the quench pot 122 is merely an optional component in the catalyst precursor material production systems 100 shown in FIG. 1 and does not affect the purity of the products produced by the catalyst precursor material production systems 100. It should be understood that in some embodiments, a quenching agent may be added to any component of the precursor material production system 100 as needed to quench the reaction, such as, for example, the precooler 120, the heat exchanger 150, or the reaction zone 130. However, some embodiments do not include a quench.

After the contents of the first reagent feed tank 110 and the second reagent feed tank 140 have been continuously added to the reaction zone 130, the contents of the reaction zone 130 are mixed to produce a catalyst precursor material 160. The conditions of the reaction zone 130 are maintained at temperatures from 0° C. to −90° C. and its contents have a residence time in the reaction zone 130 from 0.1 seconds to 120 minutes. Without being bound by theory, it is believed that the temperature range of the reaction zone 130 allows the catalyst precursor material 160 produced by such a method to produce a desired product. A suitable reaction zone 130 apparatus may include, but is not limited to, a tubular reactor or a stirred tank reactor. In embodiments, the catalyst precursor material production systems 100 may further include a nitrogen blanket, one or more thermocouples, and/or a sampling port.

In embodiments, reaction zone 130 is cooled during the continuous addition of any of the contents of the first reagent feed tank 110 and/or the second reagent feed tank 140. In embodiments, the reaction zone 130 has a temperature from 0° C. to −90° C., and all ranges and subranges therebetween, during the continuous introduction of the contents. In embodiments, the reaction zone 130 has a temperature from −5° C. to −90° C., such as from −10° C. to −90° C., from −15° C. to −90° C., from −20° C. to −90° C., from −25° C. to −90° C., from −30° C. to −90° C., from −35° C. to −90° C., from −40° C. to −90° C., from −45° C. to −90° C., from −50° C. to −90° C., from −55° C. to −90° C., from −60° C. to −90° C., from −65° C. to −90° C., from −70° C. to −90° C., from −75° C. to −90° C., from −80° C. to −90° C., or from −85° C. to −90° C. In some embodiments, the reaction zone 130 has a temperature from 0° C. to −85° C., such as from 0° C. to −80° C., from 0° C. to −75° C., from 0° C. to −70° C., from 0° C. to −65° C., from 0° C. to −60° C., from 0° C. to −55° C., from 0° C. to −50° C., from 0° C. to −45° C., from 0° C. to −40° C., from 0° C. to −35° C., from 0° C. to −30° C., from 0° C. to −25° C., from 0° C. to −20° C., from 0° C. to −15° C., or from 0° C. to −10° C. In embodiments, the reaction zone 130 has a temperature from −20° C. to −80° C., such as from −30° C. to −70° C., from −35° C. to −65° C., from −40° C. to −60° C., or from −45° C. to −55° C. Without being bound by theory, it is believed that the described temperature range of the reaction zone 130 allows for the production of a suitable catalyst precursor material. The reaction zone 130 may be cooled by any suitable apparatus.

The residence time of the contents in the reaction zone 130 may range from 0.1 seconds to 120 minutes, and all ranges and subranges therebetween, based on the previously described embodiments. Here, the term "residence time" is defined as the average time any one or more of the contents remains in the reaction zone. It is measured by dividing the reaction zone volume by the total volumetric flow rate of any of the one or more contents in the reaction zone. In embodiments, the residence time of the contents in the reaction zone 130 ranges from 1 second to 120 minutes, from 10 seconds to 120 minutes, from 30 seconds to 120 minutes, from 1 minute to 120 minutes, from 5 minutes to 110 minutes, from 10 minutes to 100 minutes, from 20 minutes to 90 minutes, from 25 minutes to 75 minutes, from 30 minutes to 70 minutes, from 35 minutes to 65 minutes, from 40 minutes to 60 minutes, from 0.1 seconds to 30 minutes, from 0.1 seconds to 10 minutes, from 0.1 seconds to 5 minutes, from 0.1 seconds to 1 minute, from 0.1 seconds to 30 seconds, from 1 second to 10 minutes, from 1 second to 5 minutes, from 1 second to 1 minute, or from 1 second to 30 seconds. In some embodiments, the residence time of the contents in the reaction zone 130 ranges from 0.1 seconds to 30 seconds, such as from 0.1 seconds to 25 seconds, from 0.1 seconds to 20 seconds, from 0.1 seconds to 15 seconds, from 0.1 seconds to 10 seconds, from 0.1 seconds to 5 seconds, from 0.1 seconds to 1 second, or from 0.1 seconds to 0.5 seconds.

The reactions in the reaction zone 130 between the dihalo-substituted-group-14 metalloid, the halogenated alkane, and the organolithium are exothermic. Accordingly, in some embodiments, the mixture of the dihalo-substituted-group-14 metalloid and/or the organolithium may optionally be quenched with any suitable quenching agent in the reaction zone 130. However, quenching any of the components in the reaction zone 130 is not a necessary step in the methods for producing a catalyst precursor material of embodiments.

Referring now to FIG. 2, additional systems and methods for producing a catalyst precursor material by introducing continuous flow streams into a reaction zone are described. In embodiments of the catalyst precursor material production systems 300 shown in FIG. 2, the contents of a first reagent feed tank 310 are introduced to an optional heat exchanger 320 by a first reagent feedstream 312, which fluidly couples the first reagent feed tank 310 with the optional heat exchanger 320. The first reagent feed tank 310 may include any suitable storage apparatus such as a cooled vessel, optionally with the ability to mix any of its contents. It should further be understood that the first reagent feed tank 310 and the optional heat exchanger 320 may be a single, combined physical unit or separate physical units, which are fluidly coupled to one another.

The heat exchanger 320 may be optionally added anywhere along the first reagent feedstream 312 to cool the contents of the first reagent feed tank 310 before its contents are introduced to a first reaction zone 330 by a cooled first reagent feedstream 314. The contents of the first reagent feed tank 310, according to embodiments, may include an organolithium reagent, optionally in solvent. The heat exchanger 320 may be any heat exchanger capable of decreasing the first reagent feedstream 312 to a temperature from 0° C. to −90° C.

In embodiments, the organolithium reagent, which is initially present in the system in the first reagent feed tank 310, may include any suitable organolithium reagent. Examples of suitable organolithium reagents may include, but are not limited to, n-butyllithium, s-butyllithium, t-butyllithium, methyllithium, or combinations thereof. In certain embodiments, the organolithium reagent initially present in the first reagent feed tank 310 is n-butyllithium.

Optionally, an amount of solvent may be added to the first reagent feed tank 310 and/or at any point along the first reagent feedstream 312 and/or at any point along the cooled first reagent feedstream 314 in order to dilute the organolithium reagent being fed to the first reaction zone 330. In embodiments, the solvent is an ethereal solvent, an alkyl solvent, an aromatic solvent, or combinations thereof.

Concurrently, the contents of a second reagent feed tank 340 are fed through an optional heat exchanger 350 by a second reagent feedstream 316, which fluidly couples the second reagent feed tank 340 to the optional heat exchanger 350. The second reagent feed tank 340 may include any suitable storage apparatus such as a cooled vessel, optionally with the ability to mix any of its contents. It should be further understood that the second reagent feed tank 340 and the optional heat exchanger 350 may be a single, combined physical unit or separate physical units.

The optional heat exchanger 350 may be optionally added anywhere along the second reagent feedstream 314 to cool the contents of the second reagent feed tank 340 to a temperature that is in the range from 0° C. to −90° C. before its contents are introduced to a first reaction zone 330 by a cooled second reagent feedstream 318. The contents of the second reagent feed tank 340, according to embodiments, may include a halogenated alkane optionally in solvent. Optionally, an amount of solvent may be added to the second reagent feed tank 340 and/or at any point along the second reagent feedstream 314 and/or at any point along the cooled second reagent feedstream 316 in order to dilute the halogenated alkane being fed to the first reaction zone 330.

In embodiments, the halogenated alkane, which is also initially present in the system 300 in the second reagent feed tank 340, may include any suitable halogenated alkane, such as a di-halogenated methane. Examples of suitable di-halogenated methanes include, but are not limited to, dibromomethane, dichloromethane, difluoromethane, diiodomethane, bromochloromethane, bromofluoromethane, bromoiodomethane, chlorofluoromethane, chloroiodomethane, fluoroiodomethane, or combinations thereof. In certain embodiments, the halogenated alkane initially present in the second reagent feed tank is bromochloromethane.

Before being continuously introduced to the first reaction zone 330, the contents of the first reagent feed tank 310 and, optionally, the second reagent feed tank 340 are cooled to a temperature from 0° C. to −90° C. In embodiments, the contents of the first reagent feed tank 310 and, optionally, the second reagent feed tank 340 are cooled to a temperature from −5° C. to −90° C., such as from −10° C. to −90° C., from −15° C. to −90° C., from −20° C. to −90° C., from −25° C. to −90° C., from −30° C. to −90° C., from −35° C. to −90° C., from −40° C. to −90° C., from −45° C. to −90° C., from −50° C. to −90° C., from −55° C. to −90° C., from −60° C. to −90° C., from −65° C. to −90° C., from −70° C. to −90° C., from −75° C. to −90° C., from −80° C. to −90° C., or from −85° C. to −90° C. In some embodiments, the contents of the first reagent feed tank 310 and, optionally, the second reagent feed tank 340 are cooled to a temperature from 0° C. to −85° C., such as from 0° C. to −80° C., from 0° C. to −75° C., from 0° C. to −70° C., from 0° C. to −65° C., from 0° C. to −60° C., from 0° C. to −55° C., from 0° C. to −50° C., from 0° C. to −45° C., from 0° C. to −40° C., from 0° C. to −35° C., from 0° C. to −30° C., from 0° C. to −25° C., from 0° C. to −20° C., from 0° C. to −15° C., or from 0° C. to −10° C. In embodiments, the contents of the first reagent feed tank 310 and, optionally, the second reagent feed tank 340 are cooled to a temperature from −20° C. to −80° C., such as from −30° C. to −70° C., from −35° C. to −65° C., from −40° C. to −60° C., or from −45° C. to −55° C. Without being bound by theory, it is believed that the addition of the organolithium reagent to the first reaction zone 330 causes an exothermic reaction, so that the system must be cooled to suitable temperatures to avoid spoliation of one or more of the reactions that occur when the contents are introduced to the first reaction zone 330 at temperatures outside of the described suitable range. As previously described, the contents entering the first reaction zone 330 may be cooled by any suitable cooling apparatus, such as, for example, a heat exchanger.

Once the contents of the first reagent feed tank 310 and the second reagent feed tank 340 are introduced into the first reaction zone 330, it is believed that the organolithium reagent lithiates the halogenated alkane in a lithiation reaction. Without being bound by theory, it is believed that lithiating the halogenated alkane in the first reaction zone 330 may improve the purity and output of the catalyst precursor materials produced by the catalyst precursor material production systems 300 shown in FIG. 2.

After the contents of the first reagent feed tank 310 and the second reagent feed tank 340 have been introduced to the first reaction zone 330, the contents of the first reaction zone 330 are mixed to produce an intermediate catalyst precursor material 326. The conditions of the first reaction zone 330 are maintained at temperatures from 0° C. to −90° C. and its contents have a residence time in the first reaction zone 330 from 0.1 seconds to 120 minutes. Without being bound by theory, it is believed that the temperature range of the first reaction zone 330 allows the intermediate catalyst precursor material 326 produced by such the method to produce a desired end product. A suitable first reaction zone 330 apparatus may include, but is not limited to, a tubular reactor or a stirred tank reactor. In embodiments, the catalyst precursor material production systems 300 may further include a nitrogen blanket, one or more thermocouples, and/or a sampling port.

Once the catalyst precursor material 326 has been produced and cooled to suitable temperatures, it is then introduced to a second reaction zone 380. In embodiments, the conditions of the second reaction zone 380 are identical to the first reaction zone 330. In other embodiments, the conditions of the second reaction zone 380 are different than first reaction zone 330.

Concurrently, the contents of a third reagent feed tank 360 are fed through an optional heat exchanger 370 by a third reagent feedstream 322, which fluidly couples the third reagent feed tank 360 to the optional heat exchanger 370. The third reagent feed tank 360 may include any suitable storage apparatus such as a cooled vessel, optionally with the ability to mix any of its contents. It should be further understood that the third reagent feed tank 360 and the optional heat exchanger 370 may be combined physical units or separate physical units.

The optional heat exchanger 370 may be added anywhere along the second reagent feedstream 322 to cool the contents of the third reagent feed tank 360 to a temperature from 0° C. to −90° C. before its contents are introduced to the second reaction zone 370 by a cooled third reagent feedstream 324. The contents of the third reagent feed tank 360, according to embodiments, may include a dihalo-substituted-group-14 metalloid, optionally in solvent. Optionally, an amount of solvent may be added to the third reagent feed tank 360 and/or at any point along the third reagent feedstream 322 and/or at any point along the cooled third reagent feedstream 324 in order to dilute the dihalo-substituted-group-14 metalloid being fed to the second reaction zone 380.

In embodiments, the dihalo-substituted-group-14 metalloid may include, but is not limited to, dichlorodiisopropylsilane, di-tert-butyldichlorosilane, dichlorodiphenylsilane, dichlorodiisopropylgermane, di-tert-butyldichlorogermane, dichlorodiphenylgermane, or combinations thereof. In certain embodiments, the dihalo-substituted-group-14 metalloid is dichlorodiisopropylsilane.

It should be understood that the concentrations of the various components in the first reagent feed tank 310 and/or the second reagent feed tank 340 may be modified by adding solvent at any point before the first reagent feed stream 314 and/or the second reagent feed stream 318 is added to the first reaction zone 330, or at any point before precursor steam 326 is add to the second reaction zone 380. Likewise, the concentration of the components in the third reagent feed tank 360 may be modified by adding solvent at any point before reagent feed stream 324 is added to the second reaction zone 380. Without being bound by theory, it is believed that if the dihalo-substituted-group-14 metalloid and/or the halogenated alkane has a concentration that is either too high or too low, it negatively affects the dilution of the components, control of the reaction rates, mixing control, and temperature maintenance of system.

In embodiments, the first reaction zone 330 and/or the second reaction zone 380 are cooled during the described processes. In embodiments, the first reaction zone 330 and/or the second reaction zone 380 have a temperature from 0° C. to −90° C., and all ranges and subranges therebetween, during the continuous introduction of the contents. In embodiments, the first reaction zone 330 and/or the second reaction zone 380 have a temperature from −5° C. to −90° C., such as from −10° C. to −90° C., from −15° C. to −90° C., from −20° C. to −90° C., from −25° C. to −90° C., from −30° C. to −90° C., from −35° C. to −90° C., from −40° C. to −90° C., from −45° C. to −90° C., from −50° C. to −90° C., from −55° C. to −90° C., from −60° C. to −90° C., from −65° C. to −90° C., from −70° C. to −90° C., from −75° C. to −90° C., from −80° C. to −90° C., or from −85° C. to −90° C. In some embodiments, the first reaction zone 330 and/or the second reaction zone 380 have a temperature from 0° C. to −85° C., such as from 0° C. to −80° C., from 0° C. to −75° C., from 0° C. to −70° C., from 0° C. to −65° C., from 0° C. to −60° C., from 0° C. to −55° C., from 0° C. to −50° C., from 0° C. to −45° C., from 0° C. to −40° C., from 0° C. to −35° C., from 0° C. to −30° C., from 0° C. to −25° C., from 0° C. to −20° C., from 0° C. to −15° C., or from 0° C. to −10° C. In embodiments, the first reaction zone 330 and/or the second reaction zone 380 have a temperature from −20° C. to −80° C., such as from −30° C. to −70° C., from −35° C. to −65° C., from −40° C. to −60° C., or from −45° C. to −55° C. Without being bound by theory, it is believed that the described temperature range of the first reaction zone 330 and/or the second reaction zone 380 allow the catalyst precursor material produced by the methods described herein to produce a desired product. The the first reaction zone 330 and/or the second reaction zone 380 may be cooled by any suitable apparatuses.

The residence time of the contents in the first reaction zone 330 and/or the second reaction zone 380 may range from 0.1 seconds to 120 minutes, and all ranges and subranges therebetween, based on the previously described embodiments. Here, the term "residence time" is defined as the average time a fluid stream remains in the first reaction zone 330 and/or the second reaction zone 380. It is measured by dividing the reaction zone volume by the total volumetric flow rate of the fluid in the reaction zone. In embodiments, the residence time of the contents in the first reaction zone 330 and/or the second reaction zone 380 range from 1 second to 120 minutes, from 10 seconds to 120 minutes, from 30 seconds to 120 minutes, from 1 minute to 120 minutes, from 5 minutes to 110 minutes, from 10 minutes to 100 minutes, from 20 minutes to 90 minutes, from 25 minutes to 75 minutes, from 30 minutes to 70 minutes, from 35 minutes to 65 minutes, from 40 minutes to 60 minutes, from 0.1 seconds to 30 minutes, from 0.1 seconds to 10 minutes, from 0.1 seconds to 5 minutes, from 0.1 seconds to 1 minute, from 0.1 seconds to 30 seconds, from 1 second to 10 minutes, from 1 second to 5 minutes, from 1 second to 1 minute, or from 1 second to 30 seconds. In some embodiments, the residence time of the contents in the first reaction zone 330 and/or the second reaction zone 380 range from 0.1 seconds to 30 seconds, such as from 0.1 seconds to 25 seconds, from 0.1 seconds to 20 seconds, from 0.1 seconds to 15 seconds, from 0.1 seconds to 10 seconds, from 0.1 seconds to 5 seconds, from 0.1 seconds to 1 second, or from 0.1 seconds to 0.5 seconds.

The reactions in the second reaction zone 380 between the dihalo-substituted-group-14 metalloid, halogenated alkane, and the organolithium are exothermic. Accordingly, in some embodiments, the mixture of in the second reaction zone 380 may optionally be quenched with a suitable quenching agent. However, quenching any of the components in the second reaction zone 380 is not a necessary step in methods for forming a catalyst precursor material of embodiments.

Further, a quench pot (not shown in FIG. 2) that includes a quenching agent, such as, for example, ammonium chloride, may be optionally be provided at any point in the catalyst precursor material production systems 300 should excess amounts of the dihalo-substituted-group-14 metalloid and/or organolithium reagent be passed through the system 300, thereby leading to process upsets. However, the quench pot is merely an optional component in the catalyst precursor material production systems 300 shown in FIG. 2 and does not affect the purity of the catalyst precursor material 390 produced by the catalyst precursor material production systems 300.

The methods described herein are suitable for preparing various catalyst precursor materials, which are used to prepare catalysts that aid the production of linear low density ethylene-based polymers. These catalysts are described in detail in WO 2018/022975 and WO 2018/083056, which is incorporated herein by reference.

As an example, and without limitation, the catalyst precursor materials, according to embodiments, may be used to produce a representative catalyst as shown in formula (I):

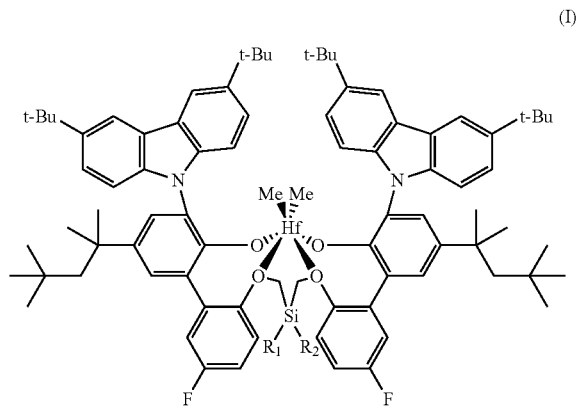

(I)

In embodiments of formula (I), M is titanium, zirconium, or hafnium, each independently being in a formal oxidation state of +2, +3, or +4; X is a group-14 metalloid; $R_1$ is isopropyl, tert-butyl, or a hexyl group; and $R_2$ is isopropyl, tert-butyl, or a hexyl group. In embodiments, $R_1$ and $R_2$ are identical to each other. In other embodiments, $R_1$ and $R_2$ are different from one another.

Formula (I) is merely illustrative of the catalysts that may be prepared by the various catalyst precursor materials, according to embodiments. It does not limit the scope of the catalysts that may be prepared by the various catalyst precursor materials described herein.

EXAMPLES

Embodiments will be further clarified by the following examples.

Example 1

A first reagent feed tank was charged with 187 grams (g) of dichlorodiisopropylsilane (DCDIS), 388 g bromochloromethane (BCM), and 1,781 g of tetrohydrofuran (THF) and mixed under a nitrogen ($N_2$) blanket. The first reagent feed tank was connected to a pre-cooler with tubing. 800 milliliters (mL) of 1.6 molar (M) hexane was introduced to the tubing. A vacuum propelled the contents of the tubing across a first heat exchanger (i.e., a coiled tube submerged in a bath filled with dry ice and acetone) and into the pre-cooler at a flow rate of 1.2 mL per minute (mL/min). Once the contents of the tubing were introduced to the pre-cooler, agitators in the pre-cooler began mixing its contents at 740 revolutions per minute (rpm). After the pre-cooler reached its desired capacity, its contents were introduced to a reaction zone by additional tubing, which fluidly connected the pre-cooler and the reaction zone.

Once the pre-cooler began flowing into the reaction zone, agitators in the reaction zone began mixing the introduced contents at 740 rpm. Upon the temperature of the reaction zone reaching −75° C., n-butyllithium (n-BuLi) was introduced from a second reagent feed tank to the reaction zone at a flow rate of 0.71 mL/min after being cooled by a second heat exchanger. The second reagent feed tank was fluidly connected to the reaction zone with tubing. The temperature of the reaction zone was maintained at about −70° C. for duration of the catalyst precursor material synthesis.

The contents of reaction zone had an average residence time of 50 minutes before being collected in a product container. The reaction zone was operated—and the catalyst precursor material collected—for 30 hours. After 30 hours, the n-BuLi was diverted to a quench pot and the tubing was flushed with hexane to clear the system from any residual lithiated species.

The conditions for the continuous synthesis of the catalyst precursor material are provided in Table 1:

TABLE 1

| Parameter | Value |
|---|---|
| Residence Time | 50 minutes |
| DCDIS concentration | 8 wt. % |
| BCM equivalents to DCDIS | 3.0 |
| n-BuLi equivalents to DCDIS | 2.5 |
| Reaction Zone Temperature | −70° C. |
| Reaction Zone Volume | 100 mL |

Three samples were collected during the 30 hour operation period. Each sample was tested for purity using a gas chromatograph (GC). Specifically, the purity of the samples was calculated by measuring the ratio of the GC area of the desired product to any undesired products. The purities of each of these samples are provided in Table 2:

TABLE 2

| Source of Sample | GC Purity |
|---|---|
| S1: Reaction Zone (8th Hour) | 96.62% |
| S2: Product Container 1 (First 20 Hours of Collection) | 64.55% |
| S3: Product Container 2 (Last 10 Hours of Collection) | 93.29% |

The first sample (S1) was taken directly from the reaction zone after eight hours of continuous operation, which accounts for its high purity, to confirm that the described catalyst precursor material was produced. A GC sample of S1, shown in FIG. 3, indicated a purity of 96.62%.

The second sample (S2) was taken from the first product container, which held the catalyst precursor material produced during the first 20 hours of operation. S2 produced a GC sample indicating a purity of 64.55%.

The third sample (S3) was taken from the second product container, which held the catalyst precursor material produced during the last 10 hours of operation. S3 produced a GC sample indicating a purity of 93.29%.

Overall, the cumulative purity of the collected samples of the catalyst precursor material was calculated to be 81.84%.

However, purity of the catalyst precursor material S3 increased by 28.74% from the 20$^{th}$ hour to 30$^{th}$ hour. This trend of increasing purity indicates that the catalyst precursor material becomes purer the longer the systems, according to embodiments described herein, are continuously in use. Therefore, the results confirm that the systems described in this disclosure are suitable for producing catalyst precursor materials in a continuous flow reaction.

Example 2

A first reagent stream was generated by pre-cooling a mixture of chloroiodomethane (CIM) and THF to −50° C. Concurrently, a second reagent stream of 2.5 M n-BuLi in hexanes was pre-cooled to −50° C. Pre-cooling was achieved by separate heat exchangers (i.e., tubing inserted into a circulating bath with chilled silicone oil) and deposited into a first reaction zone, where mixing continued for from 0.15 seconds to 0.3 seconds before being expelled to a second reaction zone. A third reagent stream containing DCDIS and THF was pre-cooled to −50° C. with a heat exchanger. The third reagent stream was then discharged to the second reaction zone, where its contents were mixed with the contents of the first reaction zone.

The conditions for the continuous synthesis of the catalyst precursor material are provided in Table 3:

TABLE 3

| Parameter | Value |
| --- | --- |
| First Reaction Zone Residence Time | 0.15 s to 0.3 s |
| Total Flow Rate | 56 milliliters per minute |
| CIM equivalents to DCDIS | 6.75 |
| n-BuLi equivalents to DCDIS | 2.25 |
| Temperature | −50° C. |
| Second Reaction Zone Pressure | 200 pounds per square inch |

Two samples were collected during a 6 hour operation period with the parameters as specified above. The sample was tested for purity using a gas chromatograph (GC). Specifically, the purity of the sample was calculated by measuring the ratio of the GC area of the desired product to any undesired products. The results of the sample are provided below in Table 4:

TABLE 4

| Parameter | Result |
| --- | --- |
| Sample 1 Purity | 94% |
| Sample 2 Purity | 85% |
| Isolated Product Yield | 71% |

Therefore, the results confirm that the systems described in this disclosure are suitable for producing catalyst precursor materials in a continuous flow reaction.

In a first aspect of this disclosure, a method includes reacting an organolithium reagent, a halogenated alkane, and at least one solvent in a first reaction zone to form a first solution; continuously adding the first solution and a second solution to a second reaction zone, wherein the second solution comprises a dihalo-substituted-group-14 metalloid and at least one solvent; and mixing the first solution and the second solution in the second reaction zone.

A second aspect of this disclosure may include the first aspect, further including separately cooling the organolithium reagent and the halogenated alkane of the first solution to a temperature from 0° C. to −90° C. before continuously adding the first solution to the first reaction zone.

A third aspect of this disclosure may include the first or second aspects, wherein the dihalo-substitutedgroup-14 metalloid comprises dichlorodiisopropylsilane, di-tert-butyldichlorosilane, dichlorodiphenylsilane, dichlorodiisopropylgermane, di-tert-butyldichlorogermane, dichlorodiphenylgermane, or combinations thereof.

A fourth aspect of this disclosure may include any of the first through third aspects, wherein the organolithium reagent comprises n-butyllithium, s-butyllithium, t-butyllithium, methyllithium, or combinations thereof.

A fifth aspect of this disclosure may include any of the first through fourth aspects, wherein the halogenated alkane comprises a di-halogenated methane, preferably bromochloromethane or chloroiodomethane.

A sixth aspect of this disclosure may include any of the first through fifth aspects, wherein the at least one solvent comprises an ethereal solvent, an alkyl solvent, an aromatic solvent, or combinations thereof.

A seventh aspect of this disclosure may include any of the first through sixth aspects, wherein the at least one solvent comprises tetrahydrofuran, hexane, or combinations thereof.

An eighth aspect of this disclosure may include any of the first through seventh aspects, wherein the first solution is cooled to a temperature from 0° C. to −90° C. before the first solution is continuously added to the second reaction zone.

A ninth aspect of this disclosure may include any of the first through eighth aspects, wherein the first reaction zone and the second reaction zone have a temperature from −40° C. to −70° C.

In a tenth aspect of this disclosure, a method includes mixing a first solution comprising a halogenated alkane, at least one solvent, and a first component selected from one of a dihalo-substituted-group-14 metalloid or an organolithium reagent in a first reaction zone; continuously adding the first solution to a second reaction zone; continuously adding a second solution to the second reaction zone, the second solution comprising at least one solvent and a second component selected from one of the dihalo-substituted-group-14 metalloid or the organolithium reagent, wherein the second component is different from the first component; and mixing the first solution and the second solution in the second reaction zone.

An eleventh aspect of this disclosure includes the tenth aspect, wherein the first component is the dihalo-substituted-group-14 metalloid and the second component is the organolithium reagent.

A twelfth aspect of this disclosure includes the tenth aspect, wherein the first component is the organolithium reagent and the second component is the dihalo-substituted-group-14 metalloid.

A thirteenth aspect of the present disclosure includes any of the tenth through twelfth aspects, wherein the dihalo-substituted-group-14 metalloid comprises dichlorodiisopropylsilane, di-tert-butyldichlorosilane, dichlorodiphenylsilane, dichlorodiisopropylgermane, di-tert-butyldichlorogermane, dichlorodiphenylgermane, or combinations thereof.

A fourteenth aspect of the present disclosure includes any of the tenth through thirteenth aspects, wherein the organolithium reagent comprises n-butyllithium, s-butyllithium, t-butyllithium, methyllithium, or combinations thereof.

A fifteenth aspect of the present disclosure includes any of the tenth through fourteenth aspects, wherein the halogenated alkane comprises a di-halogenated methane, preferably chloroiodomethane or bromochloromethane.

A sixteenth aspect of the present disclosure includes any of the tenth through fifteenth aspects, wherein the at least one solvent comprises an ethereal solvent, an alkyl solvent, an aromatic solvent, or combinations thereof.

A seventeenth aspect of the present disclosure includes any of the tenth through sixteenth aspects, wherein the at least one solvent comprises tetrahydrofuran, hexane, or combinations thereof.

An eighteenth aspect of the present disclosure includes any of the tenth through seventeenth aspects, wherein the first solution and the second solution are cooled to at least −70° C. before the first solution and second solution are continuously added to the reaction zone.

A nineteenth eighteenth aspect of the present disclosure includes any of the tenth through eighteenth aspects, wherein the reaction zone has a temperature from 0° C. to −90° C., preferably wherein the reaction zone has a temperature from −40° C. to −70° C.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:

1. A method, comprising:
reacting a halogenated alkane and a first component selected from one of a dihalo-substituted-group-14 metalloid or an organolithium reagent in a first reaction zone in the presence of at least one solvent to form a first solution;
continuously adding the first solution to a second reaction zone;
continuously adding a second solution to the second reaction zone, thereby reacting the organolithium reagent, the halogenated alkane, and the dihalo-substituted-group-14 metalloid, wherein the second solution comprises at least one solvent and a second component selected from one of the dihalo-substituted-group-14 metalloid or the organolithium reagent, wherein the second component is different from the first component; and
mixing the first solution and the second solution in the second reaction zone, thereby further reacting the organolithium reagent, the halogenated alkane, and the dihalo-substituted-group-14 metalloid, wherein the dihalo-substituted-group-14 metalloid comprises dichlorodiisopropylsilane, di-tert-butyldichlorosilane, dichlorodiphenylsilane, dichlorodiisopropylgermane, di-tert-butyldichlorogermane, dichlorodiphenylgermane, or combinations thereof.

2. The method of claim 1, wherein the first component is the dihalo-substituted-group-14 metalloid and the second component is the organolithium reagent.

3. The method of claim 1, wherein the first component is the organolithium reagent and the second component is the dihalo-substituted-group-14 metalloid.

4. The method of claim 1, wherein the organolithium reagent comprises n-butyllithium, s-butyllithium, t-butyllithium, methyllithium, or combinations thereof.

5. The method of claim 1, wherein the halogenated alkane comprises a di-halogenated methane.

6. The method of claim 1, wherein the first reaction zone, the second reaction zone, or both have a temperature from 0° C. to −90° C.

7. A method, comprising:
reacting an organolithium reagent and a halogenated alkane in a first reaction zone in the presence of at least one solvent to form a first solution;
continuously adding the first solution and a second solution to a second reaction zone, thereby reacting the organolithium reagent, the halogenated alkane, and a dihalo-substituted-group-14 metalloid, wherein the second solution comprises the dihalo-substituted-group-14 metalloid and at least one solvent; and
mixing the first solution and the second solution in the second reaction zone, thereby further reacting the organolithium reagent, the halogenated alkane, and the dihalo-substituted-group-14 metalloid, wherein the dihalo-substituted-group-14 metalloid comprises dichlorodiisopropylsilane, di-tert-butyldichlorosilane, dichlorodiphenylsilane, dichlorodiisopropylgermane, di-tert-butyldichlorogermane, dichlorodiphenylgermane, or combinations thereof.

8. The method of claim 7, further comprising separately cooling the organolithium reagent and the halogenated alkane to a temperature from 0° C. to −90° C. before continuously adding the first solution organolithium reagent and the halogenated alkane to the first reaction zone.

9. The method of claim 7, wherein the organolithium reagent comprises n-butyllithium, s-butyllithium, t-butyllithium, methyllithium, or combinations thereof.

10. The method of claim 7, wherein the halogenated alkane comprises a di-halogenated methane.

11. The method of claim 7, wherein the at least one solvent comprises an ethereal solvent, an alkyl solvent, an aromatic solvent, or combinations thereof.

12. The method of claim 7, wherein the first solution is cooled to a temperature from 0° C. to −90° C. before the first solution is continuously added to the second reaction zone.

13. The method of claim 7, wherein at least one of the first reaction zone and the second reaction zone have a temperature from −40° C. to −70° C.

14. A method of forming a catalyst precursor material, comprising:
reacting a halogenated alkane and a dihalo-substituted-group-14 metalloid in a first reaction zone in the presence of at least one solvent to form a first solution;
adding the first solution and a second solution as continuous streams to a second reaction zone, thereby reacting the halogenated alkane, the dihalo-substituted-group-14 metalloid, and a organolithium reagent and forming a catalyst precursor material, wherein the second solution comprises at least one solvent and the organolithium reagent;

mixing the first solution and the second solution in the second reaction zone contemporaneously with continued addition of the first solution and the second solution as continuous streams, thereby further reacting the halogenated alkane, the dihalo-substituted-group-14 metalloid, and the organolithium reagent and forming additional catalyst precursor material; and producing at least a portion of the catalyst precursor material from the second reaction zone contemporaneously with the continued addition of the first solution and second solution to the second reaction zone, wherein:

the first solution and the second solution are added as continuous streams to the second reaction zone for a period of greater than 20 hours, and the first reaction zone and the second reaction zone have a temperature from 0° C. to −90° C.

15. The method of claim 14, wherein:

the dihalo-substituted-group-14 metalloid comprises dichlorodiisopropylsilane, di-tert-butyldichlorosilane, dichlorodiphenylsilane, dichlorodiisopropylgermane, di-tert-butyldichlorogermane, dichlorodiphenylgermane, or combinations thereof;

the organolithium reagent comprises n-butyllithium, s-butyllithium, t-butyllithium, methyllithium, or combinations thereof; or combinations thereof.

16. The method of claim 14, wherein at least one of the first reaction zone and the second reaction zone have a temperature of from −40° C. to −70° C.

17. A method of forming a catalyst precursor material, comprising:

reacting an organolithium reagent and a halogenated alkane in a first reaction zone in the presence of at least one solvent to form a first solution;

adding the first solution and a second solution as continuous streams to a second reaction zone, thereby reacting the organolithium reagent, the halogenated alkane, and a dihalo-substituted-group-14 metalloid and forming a catalyst precursor material, wherein the second solution comprises the dihalo-substituted-group-14 metalloid and at least one solvent;

mixing the first solution and the second solution in the second reaction zone contemporaneously with continued addition of the first solution and the second solution as continuous streams, thereby further reacting the organolithium reagent, the halogenated alkane, and the dihalo-substituted-group-14 metalloid and forming additional catalyst precursor material; and producing at least a portion of the catalyst precursor material from the second reaction zone contemporaneously with the continued addition of the first solution and second solution to the second reaction zone, wherein:

the first solution and the second solution are added as continuous streams to the second reaction zone for a period of greater than 6 hours, and the first reaction zone and the second reaction zone have a temperature from 0° C. to −90° C.

18. The method of claim 17, wherein:

the dihalo-substituted-group-14 metalloid comprises dichlorodiisopropylsilane, di-tert-butyldichlorosilane, dichlorodiphenylsilane, dichlorodiisopropylgermane, di-tert-butyldichlorogermane, dichlorodiphenylgermane, or combinations thereof;

the organolithium reagent comprises n-butyllithium, s-butyllithium, t-butyllithium, methyllithium, or combinations thereof; or combinations thereof.

19. The method of claim 17, further comprising separately cooling the organolithium reagent and the halogenated alkane to a temperature from 0° C. to −90° C. before adding the organolithium reagent and the halogenated alkane to the first reaction zone.

20. The method of claim 17, wherein at least one of the first reaction zone and the second reaction zone have a temperature from −40° C. to −70° C.

* * * * *